(12) United States Patent
Banerjee et al.

(10) Patent No.: US 11,996,985 B2
(45) Date of Patent: May 28, 2024

(54) BROADBAND DATA ANALYTICS ENGINE IN A DATA ANALYTICS SYSTEM

(71) Applicant: The Boston Consulting Group, Inc., Boston, MA (US)

(72) Inventors: Sumit Banerjee, Boston, MA (US); Jaison Leo Justin, Boston, MA (US); Alexey Timashkov, Boston, MA (US); Majid Alivand, Boston, MA (US); Manuel Felipe Avella Niño, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 17/948,957

(22) Filed: Sep. 20, 2022

(65) Prior Publication Data
US 2023/0100658 A1 Mar. 30, 2023

Related U.S. Application Data

(60) Provisional application No. 63/248,358, filed on Sep. 24, 2021.

(51) Int. Cl.
*H04L 12/00* (2006.01)
*G06F 16/21* (2019.01)
(Continued)

(52) U.S. Cl.
CPC ............ *H04L 41/14* (2013.01); *G06F 16/211* (2019.01); *G06N 5/01* (2023.01); *H04W 8/22* (2013.01);
(Continued)

(58) Field of Classification Search
CPC ... H04L 41/14; H04L 43/0805; H04L 41/145; G06F 16/211; H04W 8/22; G06N 5/01; G06Q 10/063
(Continued)

(56) References Cited

U.S. PATENT DOCUMENTS 6,467,090 B1 * 10/2002 Brodigan ......... H04N 21/25833
725/98
8,695,075 B2 4/2014 Anderson et al.
(Continued)

*Primary Examiner* — Frantz Coby
(74) *Attorney, Agent, or Firm* — Fish & Richardson P.C.

(57) ABSTRACT

Methods, systems, and computer storage media for providing a broadband data analytics object for a geographical region using a broadband data analytics engine in a data analytics system. The broadband data analytics object can be a computational object that is a representation of broadband service data for a geographical region, the broadband service data is associated with features of broadband availability and broadband expansion targeting constraints (e.g., geocoding, structure type, unit counts, and speed). The broadband data analytics engine is configured to generate the broadband analytics object for the geographical region based on a combination of broadband data analytics operations, data structures (e.g. targeted-building information model), and datasets (e.g., geospatial datasets, parcel data). The broadband data analytics operations can be associated with a broadband availability ruleset algorithm that supports implementing a waterfall analytics model for generating the broadband data analytics object that can be used for interpreting broadband service data.

20 Claims, 16 Drawing Sheets

(51) Int. Cl.
*G06N 5/01* (2023.01)
*H04L 41/14* (2022.01)
*H04W 8/22* (2009.01)
G06Q 10/063 (2023.01)
H04L 43/0805 (2022.01)

(52) U.S. Cl.
CPC .......... *G06Q 10/063* (2013.01); *H04L 41/145* (2013.01); *H04L 43/0805* (2013.01)

(58) Field of Classification Search
USPC ............................................ 709/223; 714/37
See application file for complete search history.

(56) References Cited

U.S. PATENT DOCUMENTS

| | | | |
|---|---|---|---|
| 9,152,774 | B2 | 10/2015 | Lim |
| 9,529,602 | B1 | 12/2016 | Swierk et al. |
| 9,577,746 | B2 | 2/2017 | Nielsen et al. |
| 9,660,729 | B2 | 5/2017 | Totten et al. |
| 9,813,435 | B2 * | 11/2017 | Muddu ............... H04L 63/1433 |
| 10,528,454 | B1 | 1/2020 | Baraty et al. |
| 10,846,204 | B2 | 11/2020 | Vaishnav et al. |
| 11,057,237 | B2 * | 7/2021 | Ansari .................. H04L 65/102 |
| 2002/0133722 | A1 * | 9/2002 | Levanon ............... H04L 69/329 |
| | | | 348/E7.071 |
| 2018/0049043 | A1 | 2/2018 | Hoffberg |
| 2018/0309681 | A1 * | 10/2018 | Dahod .................... H04L 12/66 |
| 2020/0162503 | A1 | 5/2020 | Shurtleff et al. |
| 2022/0043791 | A1 | 2/2022 | Dwarampudi et al. |
| 2023/0103264 | A1 * | 3/2023 | Banerjee ............. G06F 11/0751 |
| | | | 714/37 |

* cited by examiner

BROADBAND DATA ANALYTICS ENGINE IN A DATA ANALYTICS SYSTEM

CROSS-REFERENCE SECTION

The present application claims the benefit of U.S. Provisional Application No. 63/248,358, filed on Sep. 24, 2021 and entitled "BROADBAND DATA ANALYTICS ENGINE IN A DATA ANALYTICS SYSTEM", the entirety of which is incorporated by reference herein.

BACKGROUND

Many companies rely on data analytics systems for computational analysis of data or statistics to discover, interpret, and communicate important patterns in data. Data analytics systems implement predictive analysis (e.g., a forecasting system) and machine learning that analyze current and historical facts to make predictions about future events. For example, a business predictive model may analyze historical and transactional data to identify risks and opportunities. A data analytics system can operate based on different types of datasets to facilitate business analytics including training machine learning models and performing predictive analysis. For example, a dataset can be used in a commercial services application, where the dataset includes customers, accounts, and transactions.

Conventionally, data analytics systems are not configured with a computing infrastructure and logic to intelligently aggregate and analyze datasets to provide the broadband service data (i.e., data associated with existing and expansion of broadband service in geographical regions). Conventional techniques for gathering broadband service data rely on human intervention and physical inspection of geographical locations, resulting in low quality broadband service data and cumbersome tools for managing and using the data. For example, an agent may go from door to door and manually investigate features associated with broadband expansion targeting constraints. Such methods are inefficient and cannot scale to support multiple and different types of geographical regions. As such, a more comprehensive data analytics systems—having an alternative basis for providing broadband data analytics systems operations—can improve computing operations and interfaces in data analytics systems.

SUMMARY

Various aspects of the technology described herein are generally directed to systems, methods, and computer storage media, for among other things, providing a broadband data analytics object for a geographical region using a broadband data analytics engine in a data analytics system. The broadband data analytics object can be a computational object that is a representation of broadband service data for a geographical region, the broadband service data is associated with broadband service data features of broadband expansion targeting constraints (e.g., geocoding, structure type, unit counts, and speed) and auditing process constraints (e.g., compliance assessment parameters). Operationally, the broadband data analytics engine is configured to generate the broadband analytics object for the geographical region based on a combination of broadband data analytics operations and broadband expansion data structures (e.g., targeted-building information model). The broadband data analytics operations can be associated with a broadband availability ruleset algorithm that supports implementing a waterfall analytics model for generating the broadband data analytics object.

The broadband data analytics engine is further configured to use analytics tools and techniques and different types of datasets—(e.g., geospatial datasets, parcel datasets, address datasets)—to generate and process the broadband data analytics object that can be used for analyzing and using broadband service data. For example, the broadband data analytics object for a geographical region can be used for validating and flagging a risk of rejection of broadband service data. In particular, broadband service data is associated with targeted expansion of broadband to a geographical region, where the broadband service data is based on broadband expansion targeting constraints—and auditing process constraints (e.g., compliance assessment parameters that are evaluated during an auditing process of targeted expansion of broadband).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIG. 1C-1I are exemplary schematics associated with a data analytics system with a broadband data analytics engine, in which embodiments described herein may be employed;

DETAILED DESCRIPTION OF THE INVENTION

Overview

Figure 1A:
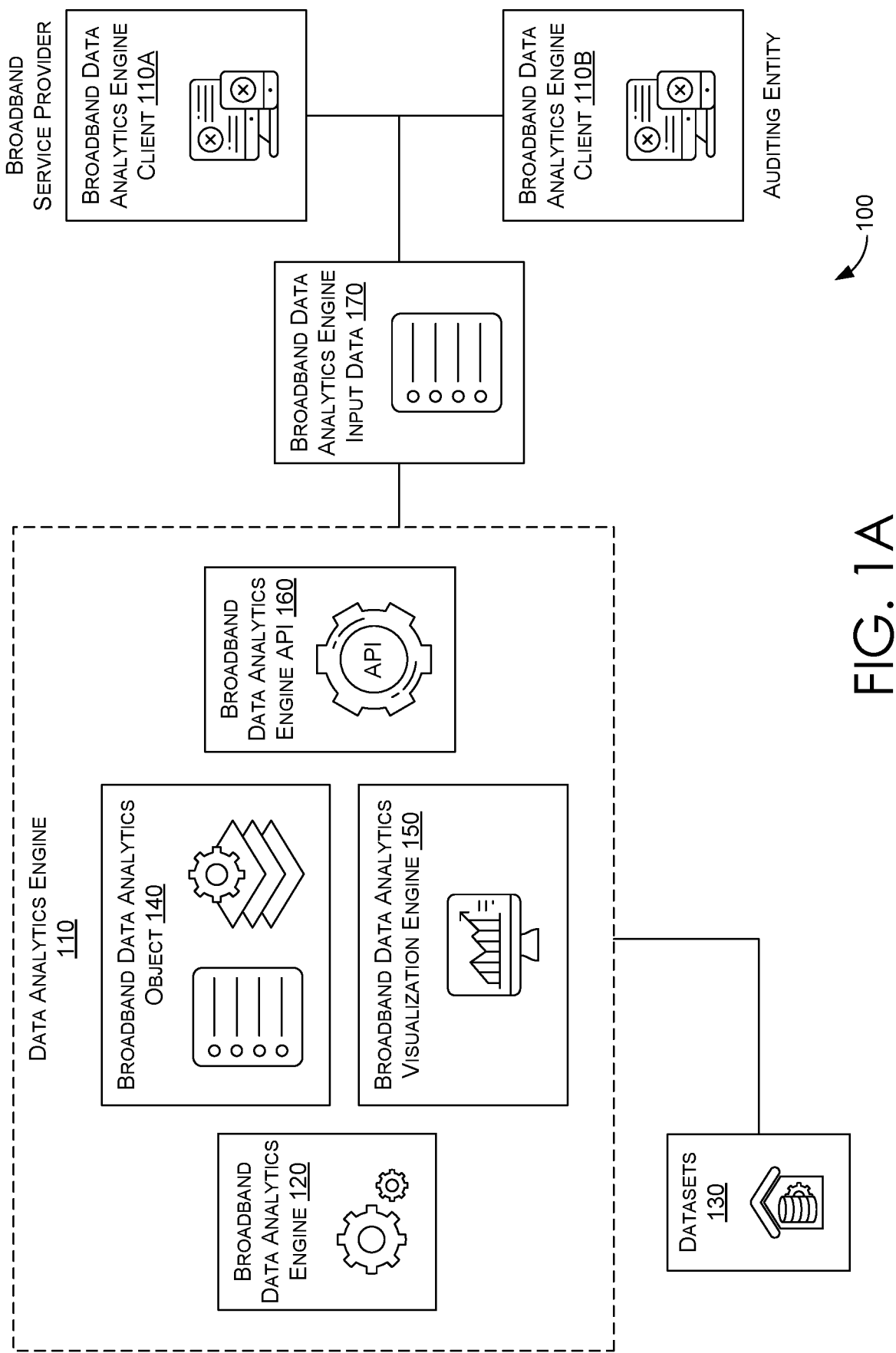
FIGS. 1A and 1B are block diagrams of an exemplary data analytics system with a broadband data analytics engine, in which embodiments described herein may be employed.

By way of background, a data analytics system can support performing computational analysis of data or statistics to discover, interpret, and communicate important patterns in data. Many companies (e.g., retail, manufacturing, travel, construction) implement data analytics systems to gather, monitor, track, model, and deploy data-driven insights to create competitive advantages. Data analytics can include business analytics that includes iterative explorations and investigations of past business performance to gain insights and drive business planning. In particular, business analytics data includes datasets that can improve business analytics processes.

By way of example, business analytics systems can be used to support operations associated with a public utility. A public utility ("utility") can refer to a maintained infrastructure for a public service. Utilities are meant to supply goods or services that are considered essential (e.g., water, gas, electricity, telephone, and broadband). In particular, broadband refers to wide bandwidth data transmission which transports multiple signals and traffic types. Broadband can be coaxial cable, optical fiber, radio, twisted pair, or satellite. With reference to internet access, broadband can refer to high-speed internet access that is always on and faster than dial-up access. Recent global activities (e.g., natural disasters or pandemics) are increasingly making the case of broadband as a top essential utility. Governments are also taking action to improve the availability of broadband. For example, governments have multiple broadband funds that help subsidize providing broadband services.

Nonetheless, it can be challenging to find the type of data needed to support expanding broadband availability. There is a lack of data sources that describe broadband service data. Broadband service data can refer to data associated with providing or expanding access to broadband functionality. Broadband service data can further describe broadband availability associated with a geographical region—where broadband availability ranges from whether broadband exists to if it does, the type of service and corresponding configuration and customers. In particular, in rural areas (e.g., non-metropolitan areas) there is limited information on whether broadband service exists, and if broadband service exists, there is limited information on the type of broadband service and who the customers of the broadband service are. For example, there are no details on whether a specific residential building or commercial building has broadband service, the type of broadband service, and how many customers have broadband service or how many customers do not have broadband service. This problem exists in part because certain geographical regions are underserved—with regard to availability of broadband service—and as such, datasets that describe these underserved geographical regions do not exist.

Expansion of broadband services—such as through government-sponsored initiatives or for growth of broadband service provider—can be more efficiently performed with an understanding of the current broadband availability in for a geographical region. In particular, certain government-sponsored initiatives may provide specific criteria that should be satisfied to qualify for the government-sponsor subsidization funds or credits associated with the initiative. Or a broadband service may have certain business criteria that should be satisfied to provide a business justification for moving forward with expanding broadband service in a particular geographical region.

Conventionally, data analytics systems are not configured with a computing infrastructure and logic to intelligently aggregate and analyze datasets to provide the broadband service data. Currently, the solution for generating broadband service data is relatively manual and resource intensive. For example, an agent may go from door to door and manually investigate and retrieve broadband service data that is associated with broadband expansion targeting constraints or auditing process constraints. Such methods are inefficient and cannot scale to support multiple and different types of geographical regions. Moreover, such manually-gathered information is not associated with interfaces that can provide user interface operations for managing (e.g., capturing, filtering, analyzing, validating, communicating or viewing) the broadband service data. In particular, broadband service providers are unable to validate broadband service deployment data in a timely manner. Physical verification is extremely expensive and impractical given the number of locations that need to be validated. Validating broadband deployment can implicate access to funding and success of auditing process performed by an auditing entity. As such, a more comprehensive data analytics systems—having an alternative basis for providing broadband data analytics systems operations—can improve computing operations and interfaces in data analytics systems.

Embodiments of the present disclosure are directed to providing a broadband data analytics object for a geographical region using a broadband data analytics engine in a data analytics system. The broadband data analytics object can be a computational object that is a representation of broadband service data for a geographical region, the broadband service data is associated with features of broadband expansion targeting constraints (e.g., geocoding, structure type, unit counts, and speed) and auditing process constraints (e.g., compliance assessment parameters).

Operationally, the broadband data analytics engine is configured to generate the broadband analytics object for the geographical region based on a combination of broadband data analytics operations and data structures (e.g. targeted-building information model). The broadband data analytics operations can be associated with a broadband availability ruleset algorithm that supports implementing a waterfall analytics model for generating the broadband data analytics object. The broadband data analytics engine is further configured to use analytics tools and techniques and different types of datasets— (e.g., geospatial datasets, parcel datasets, address datasets)—to generate and process the broadband data analytics object that can be used for analyzing and using broadband service data. For example, the broadband data analytics object for a geographical region can be used for validating and flagging a risk of rejection of broadband service data with reference to broadband expansion targeting constraints associated with an auditing process.

At a high level, a broadband data analytics engine provided to leverage different types of datasets (e.g., a dataset associated with geospatial technology), advanced analytics and automated processes to generate a broadband data analytics object. The broadband data analytics object can be used to perform different types of data analytics operations—in the broadband data analytics engine—including pin-pointing validation errors in broadband service deployment data associated with a broadband service provider. The broadband data analytics engine can include a targeted-building information model that integrates a building footprint (i.e., building features) and parcel data (i.e., parcel features) to accurately match broadband service deployment data with residential or commercial structures. Aerial imagery of targeted-buildings or geographical regions can be used to validate and fine-tune the broadband data analytics engine (e.g., a broadband data analytics object computation model). The broadband data analytics engine can be part of an end-to-end data analytics system that provides access (e.g., via a broadband data analytics API) to broadband data analytics objects to view, analyze, and process broadband service data. In this way, the data analytics system can provide transparency to clients to modify the model to support their specific client preferences and constraints.

The broadband data analytics engine can support a ruleset and decision tree (e.g., a broadband data analytics object computation logic) that is a compliance assessment ruleset. The compliance assessment ruleset is generated based on different data types of datasets (e.g., geo-datasets including building footprint data, parcel data, and address data). The compliance assessment ruleset can be used to identify non-compliant locations and other types of compliance issues associated with an auditing process for reviewing broadband service deployment data associated with a broadband service provider. The compliance assessment ruleset can support checking location accuracy in broadband service deployment data, actual duplicated data, risk of duplicate data, level of confidence in a number of units (e.g., households or mailstops) and broadband speed enablement.

The compliance assessment ruleset corresponds to a decision tree, where the decision tree may be a flowchart-like structure in which each internal node represents a test on a broadband data analytics feature (e.g., broadband expansion targeting constraints or auditing process constraints) and each branch represents an outcome of the test, and each leaf node presents a classification label (i.e., a decision taken after computing the broadband analytics features). In this way, the paths from root to leaf can represent classification rules. The decision tree can be implement using different types of programming languages and computing resources (e.g., Python and SQL) associated with a decision tree model. The decision tree operates with a data governance strategy (e.g., a set of instructions on the collection, processing, roles, policies and metrics associated with the broadband service) and remediation protocols (e.g., instructions on how to manage deviations from expected outcomes).

The data analytics system may support executing different types of operations associated with the broadband data analytics engine and the broadband data analytics object. For example, a computing script can be used to orchestrate a validation process through all the compliance assessment ruleset. The broadband data analytics engine can support running the validation process in a centralized way (e.g., code can be written as a command line interface). An Application Programming Interface (e.g., broadband data analytics API) can further be implemented to support accessing the broadband data analytics object and executing functionality associated with broadband data analytics object.

In operation, by way of example, broadband service data features—associated with transmission of wide bandwidth data over a high speed internet connection—can be identified and defined for training a broadband data analytics object computation model at a broadband data analytics engine. The broadband service data features can correspond to broadband expansion targeting constraints (e.g., associated with a government broadband service data expansion initiative) or auditing process constraints (e.g., associated with compliance assessment). Based on broadband service data features, a broadband data analytics object computation model, where the broadband data analytics object computation model comprises a compliance assessment ruleset associated with a decision tree.

Broadband data analytics engine input data associated with a geographical region, is accessed, where broadband data analytics engine input data comprises broadband expansion target constraints or broadband service deployment data. Based on accessing the broadband analytics engine input data, a broadband data analytics object that is a representation of aggregated broadband service data for the geographical region is generated. The broadband data analytics object—using a broadband data analytics visualization engine or a broadband data analytics engine API can be used to execute one or more of the following: generating a broadband service data visualization; validating one or more broadband service deployment data attributes; and communicating the broadband data analytics object to cause analysis of the broadband data analytics object via a predictive analysis model of a broadband service provider, or broadband service expansion analysis model, or a broadband service deployment auditing model.

Aspects of the technical solution can be described by way of examples and with reference to FIGS. 1A-1I. FIG. 1A illustrates a data analytics system 100 including data analytics engine 110, broadband data analytics engine client 110A (e.g., broadband service provider) and broadband analytics engine client 110B (e.g., auditing entity). The data analytics engine further includes broadband data analytics engine 120, datasets 130, broadband data analytics object 140, broadband data analytics visualization engine 150, broadband data analytics engine API.

The broadband data analytics engine 120 is responsible for generating broadband data analytics objects that are used to perform broadband data analytics operations. The broadband data analytics object 140 supports circumventing manual aggregation of broadband service data. And, the broadband data analytics engine 120 supports programmatically generating the broadband data analytics object 120 as a representation of aggregated broadband service data. The broadband data analytics object 140 can be provided via a broadband data analytics interface (e.g., a visualization) for managing (e.g., capturing, filtering, analyzing, validating, and communicating, and viewing) broadband service data (e.g., input data). In particular, the broadband data analytics object 140 can be used to validate broadband service deployment data.

By way of illustration, a broadband service provider (e.g., via a broadband data analytics engine 110A) can provide broadband service deployment data that is compared to—using the broadband data analytics object 140—to validate the broadband service deployment data. A determination can be made whether there exists any inconsistencies between the broadband service deployment data and the broadband data analytics object—that is a representation of aggregated broadband service data for a geographical region. The broadband data analytics object 140 can further be used to communicate broadband service deployment data to an auditing entity (e.g., via API and a broadband data analytics engine 110B).

The broadband data analytics engine 120 is also responsible for generating the broadband data analytics object computation model that is used in generating the broadband data analytics object 140. The broadband data analytics object computation model supports generating broadband data analytics objects associated with broadband service availability for corresponding geographical regions. The broadband data analytics object computation model can receive input data (e.g., broadband expansion targeting constraints or broadband service deployment data) to determine how to generate the broadband analytics data object.

Figure 1B:
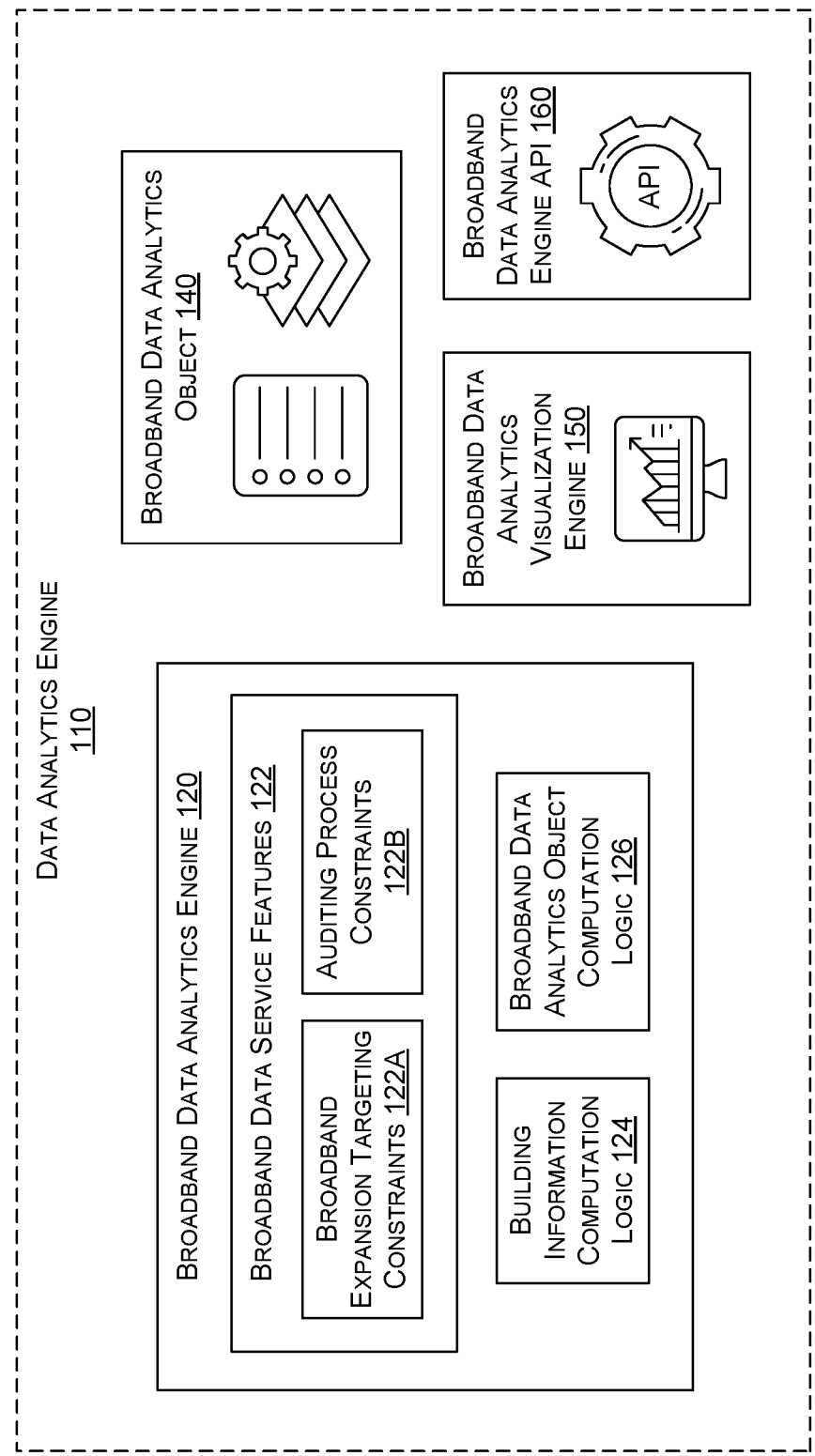

By way of illustration, broadband expansion targeting constraints can include broadband service data features of geographical region that is targeted for expansion (e.g., criteria of a broadband service provider expansion plan). And, broadband service deployment data can include broadband service data features associated with a deployment of broadband service data (e.g., details of deployed broadband service of a broadband service provider). In this way, input data (i.e., broadband expansion target constraints or the broadband service deployment) data can indicate a geographical region, addresses, building footprints that are used in generating a corresponding broadband data analytics object of aggregated broadband service data—using the broadband data analytics object computation model. As such, the broadband data analytics object corresponds to the input data—and the broadband data analytics object can be used to perform broadband data analytics operations on the input data. Moreover, the broadband data analytics object can be communicated to cause analysis of the broadband data analytics object via predictive analysis model of a broadband service provider, or broadband service expansion analysis model, or a broadband service deployment auditing model. For example, the broadband data analytics object can be used to make predictions for a broadband service provider (e.g., using a machine learning model), perform analysis on how to effectively expand broadband service in different geographical regions, or performing With reference to FIG. 1B, FIG. 1B illustrates aspects of the data analytics engine 110 includes broadband data analytics engine 120, broadband data analytics object 140, broadband data analytics visualization engine 150, broadband data analytics engine API 160. The broadband data analytics engine further includes broadband service data features 122—including broadband expansion targeting constraints 122A and auditing process constraints 122B; building information computation logic 124, and broadband data analytics object computation logic 126.

The data analytics system 100 (i.e., broadband data analytics system) is responsible for providing a broadband data analytics object for a geographical region—such that the broadband data analytics object is a representation of broadband service data for the geographical geographic region. The data analytics system is an end-to-end data analytics system that include the broadband data analytics engine 120 and provides access (e.g., via a broadband data analytics API) to broadband data analytics objects to view, analyze, and process broadband service data.

The broadband data analytics engine 120 is responsible for using the building information computation logic 124 and the broadband data analytics object computation logic 126. The building information computation logic 124 supports using geo-datasets (e.g., datasets 130) to generate building information models that are used in generating the broadband data analytics object computation model—for generating the broadband data analytics object. The building information model is a representation of data types (e.g., building-related broadband service data) associated with providing broadband service data. For example, a building information model can include information associated with a building including addresses, building footprints, and parcels. The building information model can be generated based historical information of non-compliant locations such that rules can be defined based on historical information of buildings that were not compliant. As such, the building information computation logic 124 supports using datasets (e.g., geospatial datasets, parcel datasets, address datasets) to create a building information model associated with broadband service.

The broadband data analytics object computation logic 126 refers to the logic in the broadband data analytics objection model that is used to generate the broadband data analytics object. The broadband data analytics objection computation logic 126 can be associated with broadband service data features 122 including broadband expansion targeting constraints 122A and auditing process constraints 122B. The broadband data analytics engine 120 accesses broadband service data features 122 to generate the broadband data analytics objects. Broadband service data features are attributes or variables of associated with providing broadband service. Broadband service features can be for existing broadband service or for expanding broadband service in a geographical region. Broadband service features can be used to develop a broadband data analytics object computation model. In particular, the broadband data analytics object computation model can include a compliance assessment ruleset and a decision that are used to generate a broadband data analytics object. The broadband data analytics object computation model is generated based on geographically-based datasets (e.g., addresses, building footprints, and parcels). In particular, the compliance assessment ruleset and decision tree are a set of rules that comprise checks on input data (e.g., broadband expansion target constraints or broadband deployment data), the checks are associated with location accuracy, risk of duplicates, level of confidence in number of units. The ruleset leverages data analytics tools to programmatically validate input data based on decision trees that are based on audit logic. Input data is processed through the broadband data analytics object computation model to generate a broadband data analytics object that can be used to visualize validation details.

The broadband service data features include broadband expansion targeting constraints 122A and auditing process constraints. The broadband expansion targeting constraints refer to traits that are used for targeting broadband expansion to geographical regions. For example, a type of building may be broadband expansion targeting constraint—such whether a specific building is a residential building or a commercial building; whether the building already has broadband service; the type of service the building already has, etc.

The auditing process constraints refer to compliance assessment parameters for broad expansion to geographical regions. For example, government-sponsored initiatives can indicate specific requirements that should be met in order to receive incentives for expanding broadband service. For example, a geographical region, a type of building, and a type of broadband service are auditing process constraints that are captured as broadband service data features.

Broadband service data features can also be associated with business criteria that should be satisfied to provide justification moving forward with expanding broadband service. In this way, broadband service data features can be used to provide a representation of broadband service that is associated with a particular geographical regions and more granularly buildings in the geographical region.

The broadband data analytics API 160 is responsible for providing different types of access to functionality provided via the data analytics engine 110. The broadband data analytics API 160 supports accessing broadband data analytics engine input data. The broadband data analytics API 160 supports validating one or more broadband deployment data attributes. The broadband data analytics API 160 supports communicating a broadband data analytics object to cause analysis of the broadband data analytics object at one or more analysis models.

The broadband data analytics visualization engine 150 is responsible for generating a broadband service data visualization. The broadband data analytics visualization engine 150 provide access to broadband service data via broadband data analytics object layers. The broadband data analytics object layers can be identified can identify geographic regions via geohash identifiers. The broadband service visualization engine 150 can be provided based on a web-service that provides a broadband data analytics interface for accessing broadband service data associated with the broadband data analytics object.

With reference to FIG. 1C-1I. FIG. 1C-1I illustrate aspects—schema representations—associated with providing a broadband data analytics object for a geographical region using a broadband data analytics engine in a data analytics system. The broadband data analytics engine 120 can be provided via a web-service. The web-service can support operations and communications between devices in the data analytics system 100. The web-service can be implemented such that a plurality of user of the web-service (e.g., broadband data analytics engine client 110A or broadband data analytics engine client 110B) have corresponding operating environments for executing operations with the web-service that provide the functionality described herein. The web-service operating environment can include standardized and tailored operating environment features. For example, the operating environment can be tailored for a broadband service provide or an auditing entity for performing corresponding broadband data analytics operations. The web-service can further operate with the broadband data analytics engine API 160 to provide the functionality described herein.

Figure 1C:
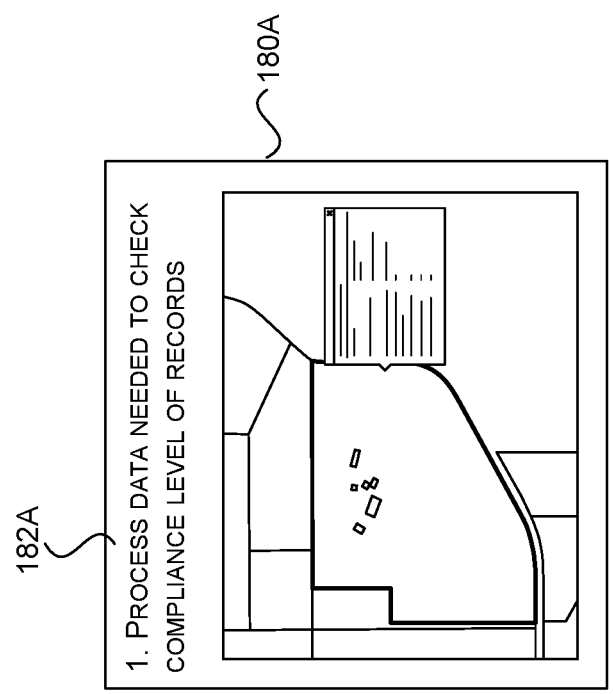

Turning to FIG. 1C, FIG. 1C illustrates a broadband data analytics operation schematic 180A associated with a broadband data analytics operation 182A for employing a broadband data analytics object computation model. In particular, the broadband data analytics operation 182A supports processing data needed to check compliance level of records. For example, broadband service data features associated with transmission of wide bandwidth data over a high speed internet connection can be accessed, such that, based on broadband service data features, a broadband data analytics object computation model, is generated.

Figure 1D:
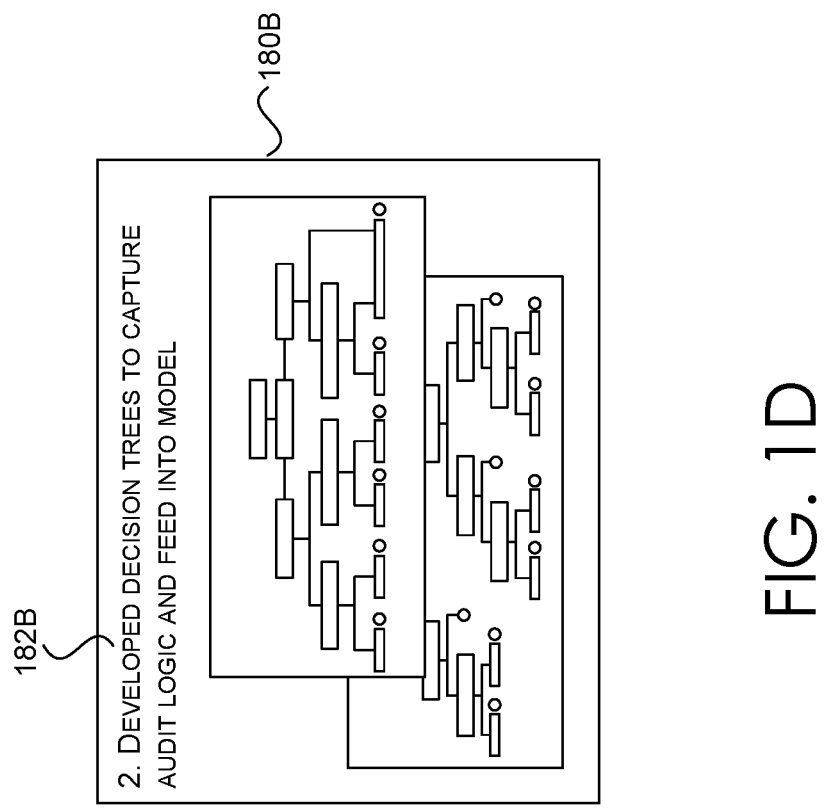

Turning to FIG. 1D, FIG. 1D illustrates a broadband data analytics operation schematic 180B associated with a broadband data analytics operation 182B for employing a broadband data analytics object computation model. In particular, the broadband data analytics operation 182B supports developing decision trees to capture audit logic and feed into the broadband data analytics object computation model. For example, the broadband data analytics object computation model is generated, where the broadband data analytics object computation model comprises a compliance assessment ruleset associated with a decision tree. The broadband analytics object computation model supports generating broadband data analytics objects associated with broadband service availability in corresponding geographical regions.

Figure 1E:
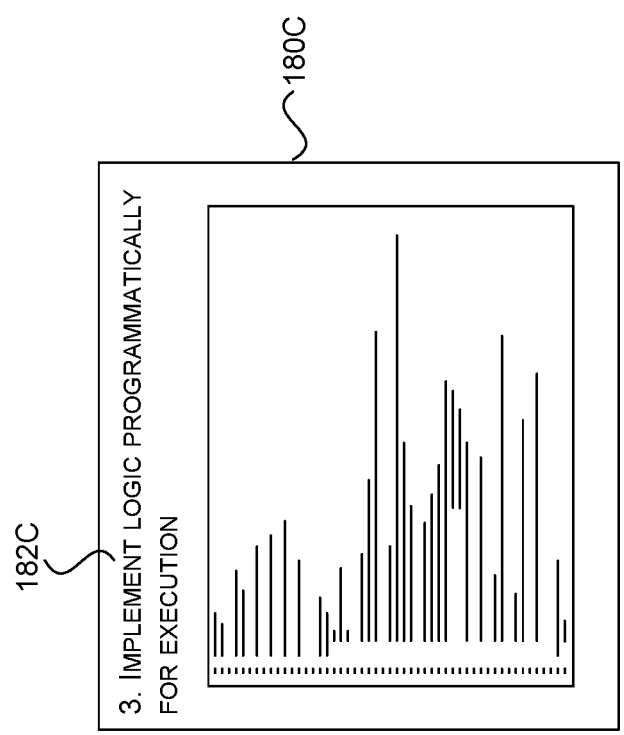

Turning to FIG. 1E, FIG. 1E illustrates a broadband data analytics operation schematic 180C associated with a broadband data analytics operation 182C for employing a broadband data analytics object computation model. In particular, the broadband data analytics operation 182C supports implementing logic programmatically for execution. For example, input data associated with a geographical region is accessed, wherein the input data comprises broadband expansion target constraints or broadband service deployment data. Based on the broadband data analytics object computation model and the broadband analytics engine input data, a broadband data analytics object that is a representation of aggregated broadband service data for the geographical region. The broadband data analytics object can be used to perform a plurality of broadband data analytic operations.

Figure 1F:
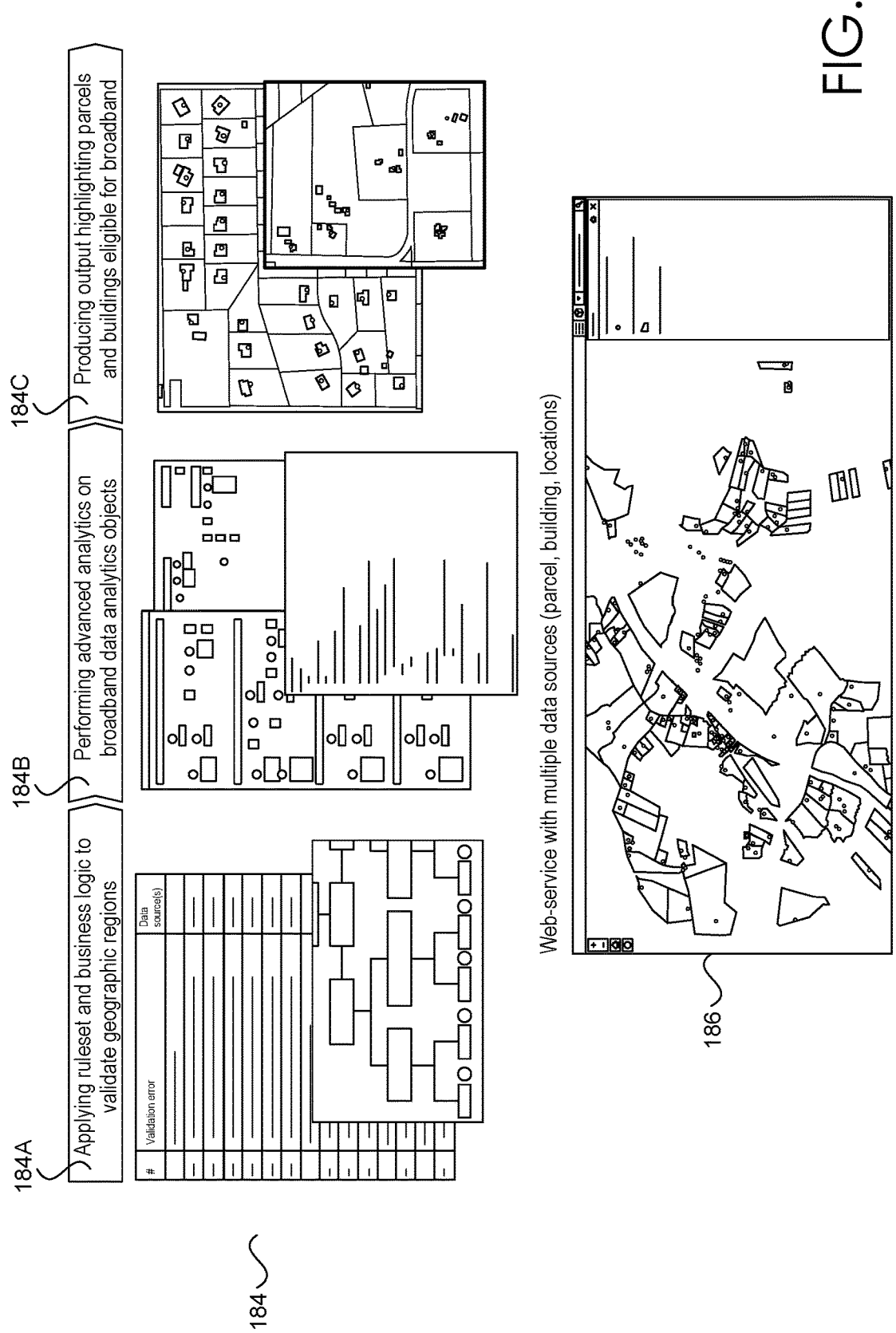

Turning to FIG. 1F, FIG. 1F illustrates an end-to-end broadband data analytics system schematic 184 associated with a broadband data analytics interface 186 (e.g., web-service interface) for broadband data analytics object for a geographical region using a broadband data analytics engine. In particular, the broadband data analytics system schematic 184 illustrates a plurality of broadband data analytics operations (i.e., 184A, 184B, and 184C). At a high level, broadband data analytics operation 184A supports applying ruleset and business logic to validate locations; broadband data analytics operation 184B supports performing advanced analytics on broadband data analytics objects; and broadband data analytics operation 184C supports producing output highlighting parcels and buildings eligible for broadband. The broadband data analytics interface 186 can refer to a web-service associated with multiple data sources (e.g., parcels, buildings, locations).

Figure 1G:
Figure 1H:
Figure 11:
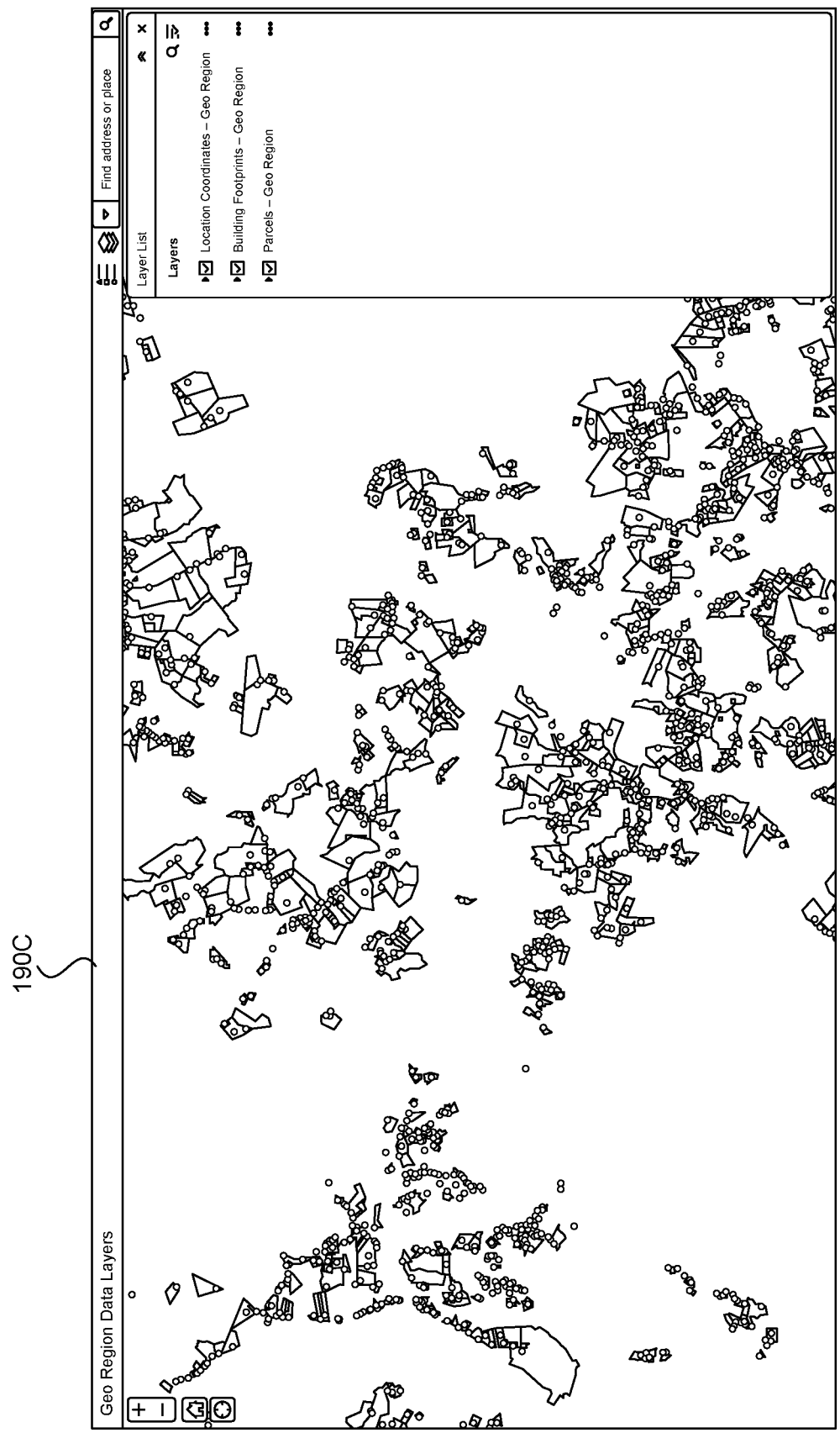

Turning to FIGS. 1G-1I, FIG. 1G-1I illustrates aspects—interface representations—associated with the broadband data analytics engine 120, the broadband data analytics visualization engine 150, the broadband data analytics client 110B, and the broadband data analytics client 110C. At a high level, the broadband data analytics visualization engine 150 operates to generate interface data. Interface data includes user interface elements, broadband data analytics graphical interface elements, broadband data analytics results data, and instructions on how to generate corresponding user interfaces that support interactions between users and the broadband data analytics system.

User interfaces allow effective operation and control by users while the data analytics simultaneously perform computing operations. Interface data can include graphical user interfaces that allow users to interact with the data analytics system through graphical user interface elements. A graphical user interface can include a web-service interface that provides a visual display of data. As shown in FIGS. 1G-1I, geographical region data layers (e.g., location coordinates, building footprints, parcels) that be presented at different levels of granularity corresponding to broadband service data in web-service interface 190A, web-service interface 190B, and web-service interface 190C. In this way, the broadband data analytics visualization engine 150 provides access to broadband service data via broadband data analytics object layers. The broadband data analytics object layers can be identified can identify geographic regions via geohash identifiers. The broadband service visualization engine 150 can be provided based on a web-service that provides a broadband data analytics interface for accessing broadband service data associated with the broadband data analytics object.

Figure 2A:
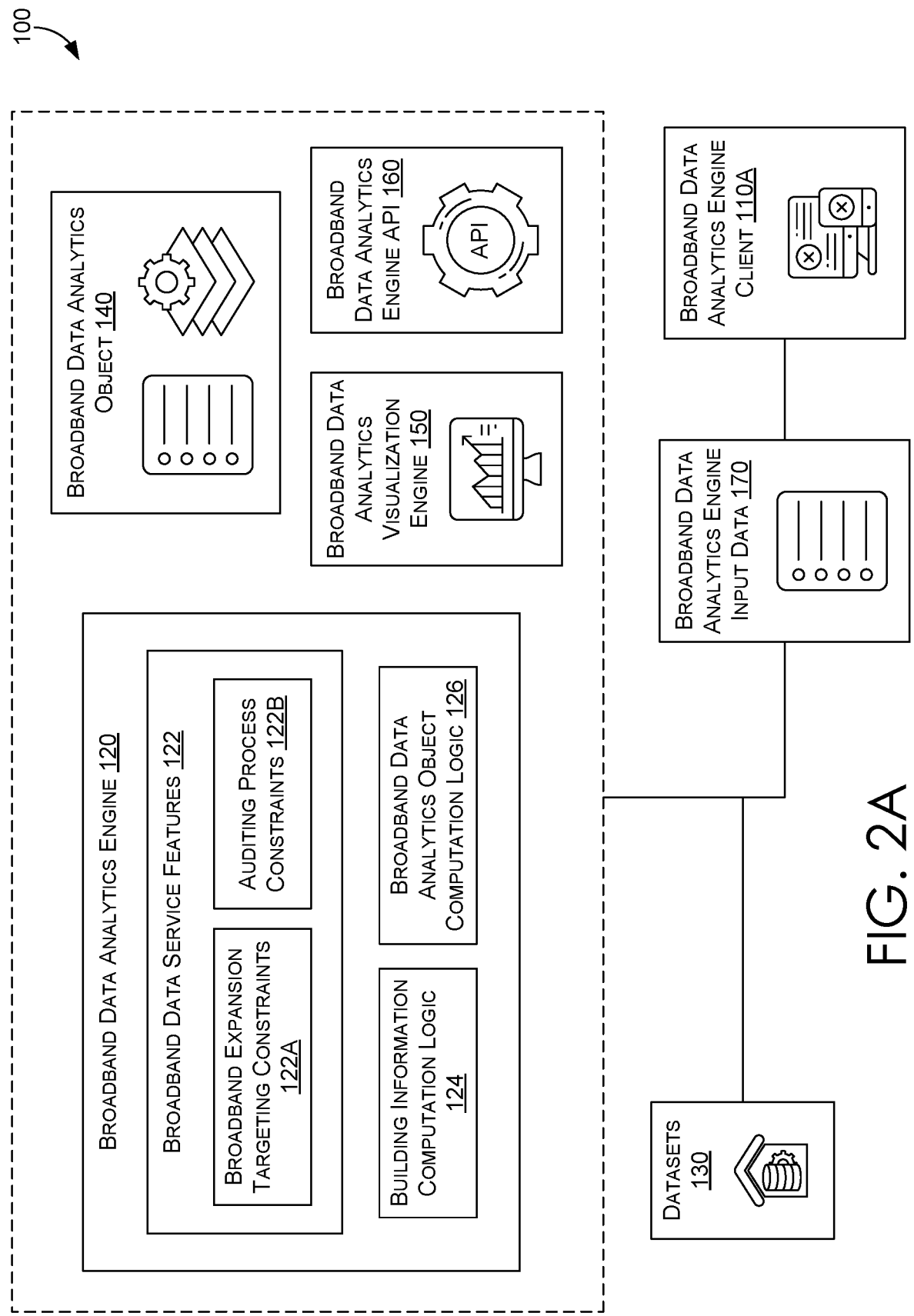
FIGS. 2A and 2B are block diagrams of an exemplary data analytics system with a broadband data analytics engine, in which embodiments described herein may be employed.
Figure 2B:
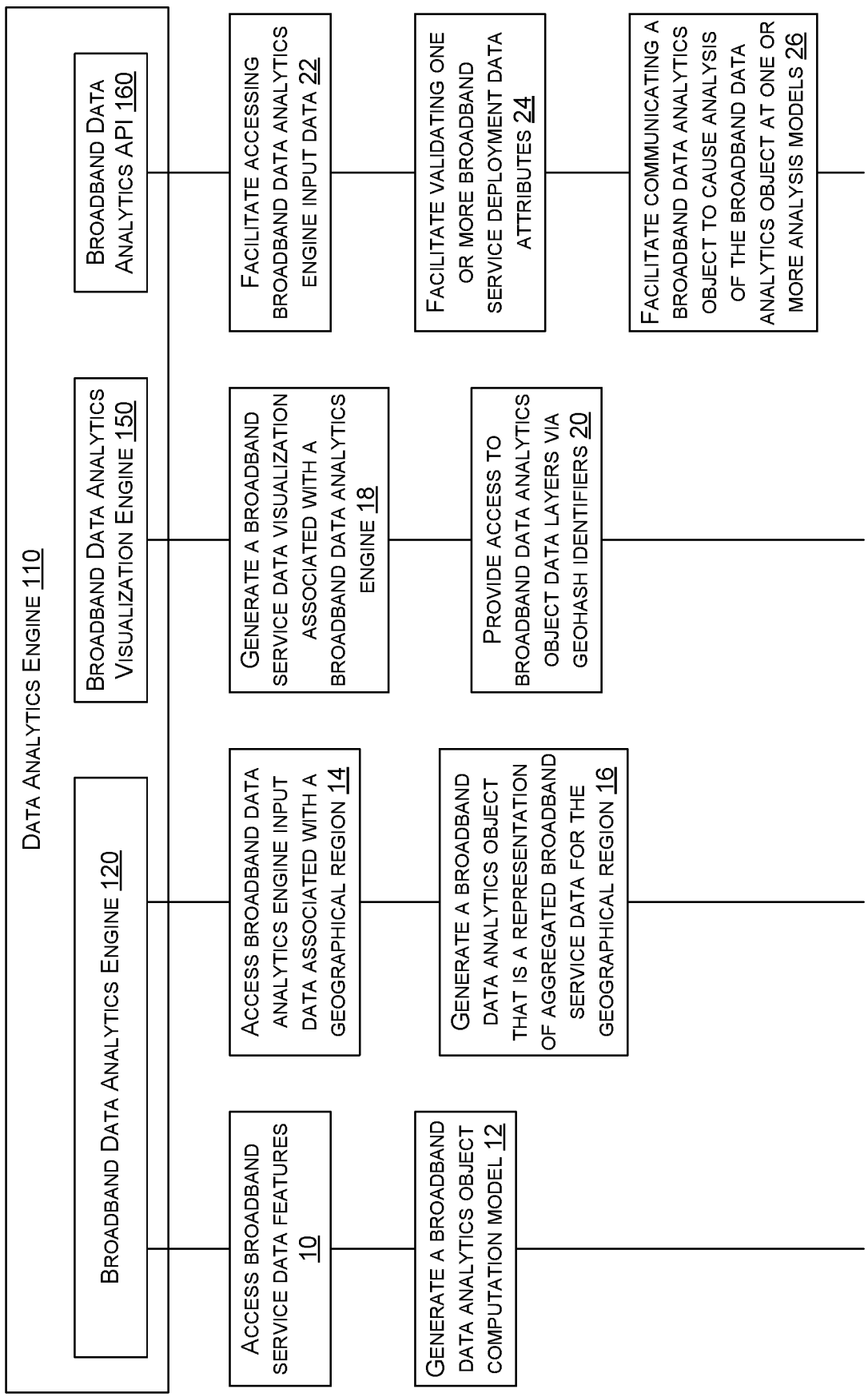

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example data analytics system 100 in which methods of the present disclosure may be employed. In particular, FIG. 2A shows a high level architecture of the data analytics system 100 in accordance with implementations of the present disclosure. Among other engines, managers, generators, selectors, or components not shown (collectively referred to herein as "components"), the technical solution environment of data analytics system 100 corresponds to FIGS. 1A and 1B.

With reference to FIG. 2A, FIG. 2A illustrates data analytics system 100 including data analytics engine 110, broadband data analytics engine client 110A, broadband data analytics engine 120, datasets 130, broadband data analytics object 140, broadband data analytics visualization engine 150, broadband data analytics engine API 160. The broadband data analytics engine further includes broadband service data features 122—including broadband expansion targeting constraints 122A and auditing process constraints 122B; building information computation logic 124, and broadband data analytics object computation logic 126.

The broadband data analytics engine 120 is responsible for generating broadband data analytics objects that are used to perform broadband data analytics operations (e.g., via broadband data engine API 160 and broadband data analytics engine client 110A). The broadband data analytics object 140 supports circumventing manual aggregation of broadband service data. And, the broadband data analytics engine 120 supports programmatically (e.g., using broadband service data features 122, building information computation logic 124, and broadband data analytics object computation logic 126) generating the broadband data analytics object 120 as a representation of aggregated broadband service data.

The broadband data analytics engine client 110A can communicate broadband data analytics engine input data to generate the broadband data analytics object 140. The broadband data analytics object 140 can be provided via a broadband data analytics interface (e.g., a visualization) for managing (e.g., capturing, filtering, analyzing, validating, and communicating, and viewing) broadband service data (e.g., input data). In particular, the broadband data analytics object 140 can be used to validate broadband service deployment data.

With reference to FIG. 2B, FIG. 2B illustrates broadband data analytics engine 130, broadband data analytics engine 120, broadband data analytics visualization engine 150, and broadband data analytics API 160. At block 10, access broadband service data features. At block 12, based on the broadband service data features, generate a broadband data analytics object computation model. At block 14, access broadband data analytics engine input data associated with a geographical region. At block 16, generate a broadband data analytics object, the broadband data analytics object is a representation of aggregated broadband service data for the geographic region.

At block 18, generate a broadband service visualization associated with a broadband data analytics engine. At block 20, provide access to broadband data analytics object data layers via geohash identifiers. At block 22, facilitate accessing broadband analytics input data. At block 24, facilitate validating one or more deployment service data attributes. At block 26, facilitate communicating a broadband data analytics object to cause analysis of the broadband data analytics model at one or more analysis models.

Exemplary Methods

Figure 3:
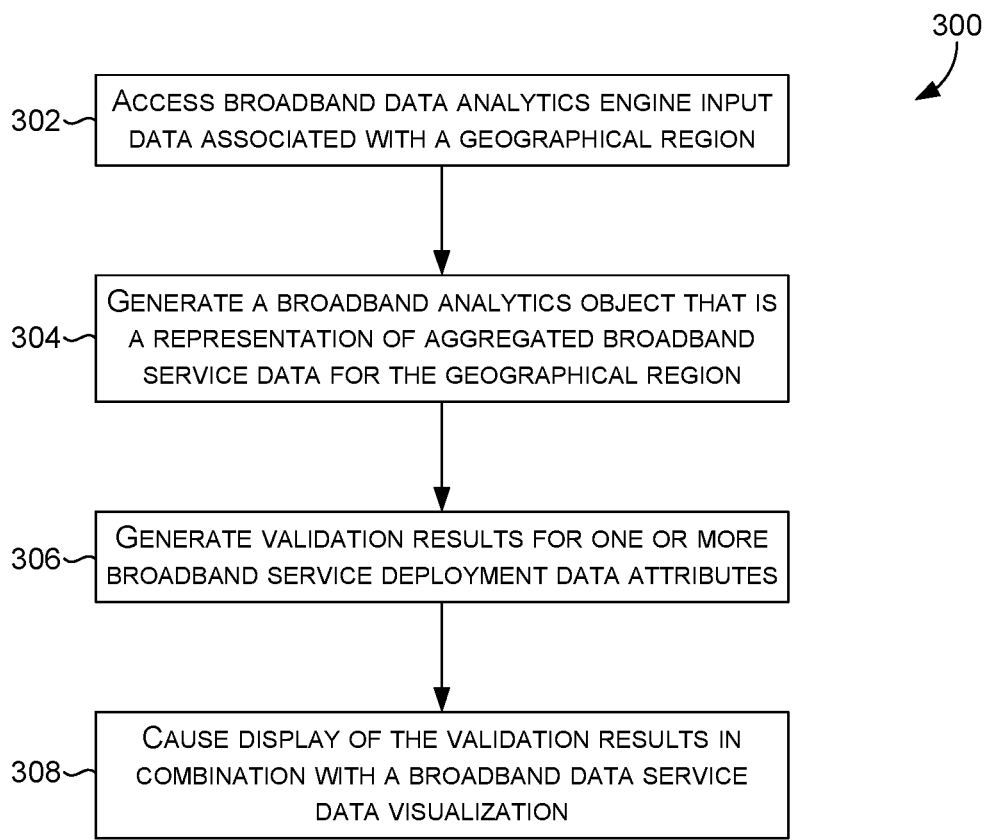
FIG. 3 is a flow diagram showing an exemplary method for implementing a data analytics system with a broadband data analytics engine, in accordance with embodiments described herein.
Figure 4:
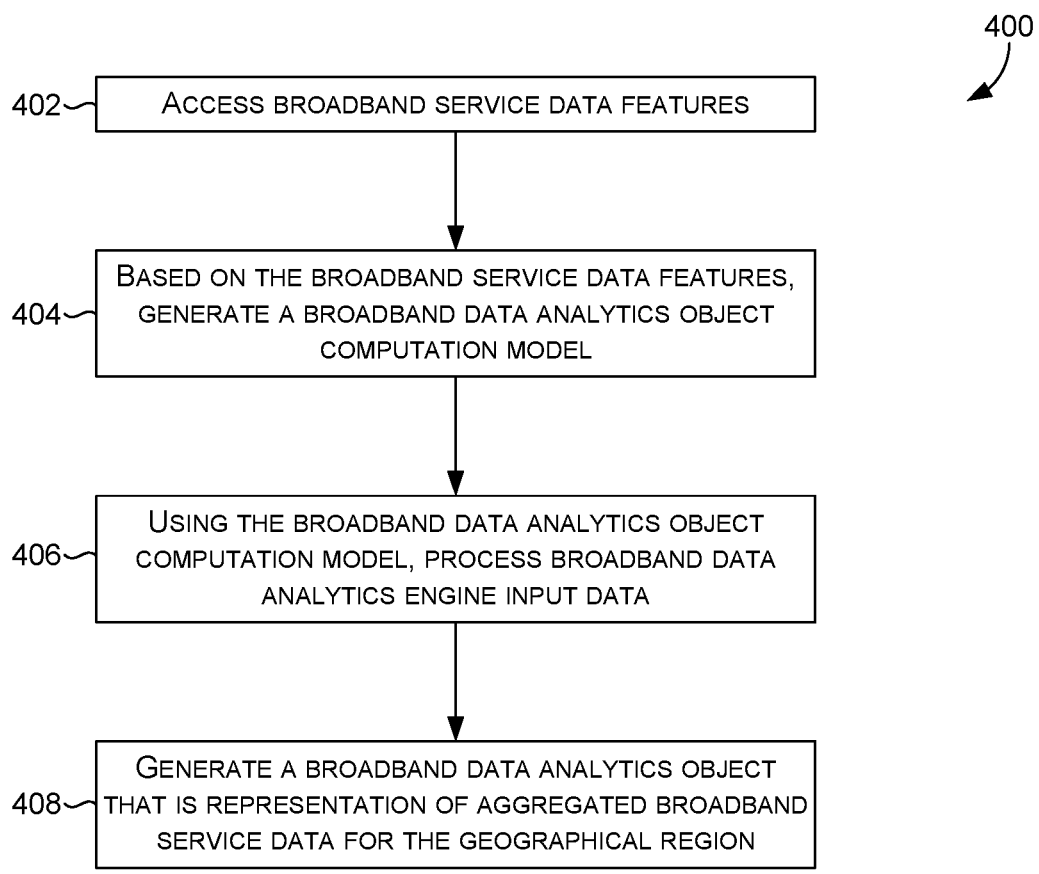
FIG. 4 is a flow diagram showing an exemplary method for implementing a data analytics system with a broadband data analytics engine, in accordance with embodiments described herein.
Figure 5:
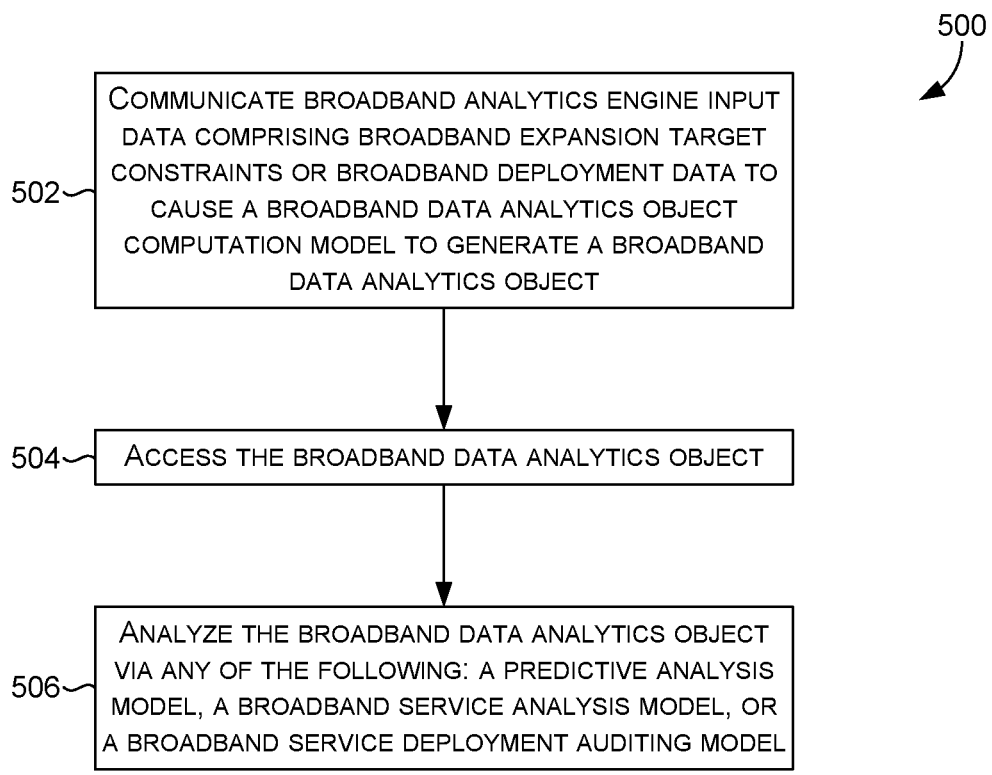
FIG. 5 is a flow diagram showing an exemplary method for implementing a data analytics system with a broadband data analytics engine, in accordance with embodiments described herein.

With reference to FIGS. 3, 4 and 5, flow diagrams are provided illustrating methods for a broadband data analytics object for a geographical region using a broadband data analytics engine in a data analytics system. The methods may be performed using the data analytics system described herein. In embodiments, one or more computer-storage media having computer-executable or computer-useable instructions embodied thereon that, when executed, by one or more processors can cause the one or more processors to perform the methods (e.g., computer-implemented method) in the virtualization system (e.g., a computerized system or computing system).

Turning to FIG. 3, a flow diagram is provided that illustrates a method 300 for providing a broadband data analytics object for a geographical region using a broadband data analytics engine in a data analytics system. At block 302, access broadband data analytics engine input data associated with a geographical region. At block 304, generate a broadband analytics object that is a representation of aggregated broadband service data for the geographical region. At block 306, generated validation results for one or more broadband service deployment data attributes. At block 308, cause display of the validation results in combination with a broadband service data visualization.

Turning to FIG. 4, a flow diagram is provided that illustrates a method 400 for providing a broadband data analytics object for a geographical region using a broadband data analytics engine in a data analytics system. At block 402, access broadband service data features. At block 404, based on the broadband service data features, generate a broadband data analytics object computation model. At block 406, using the broadband data analytics object computation model, process broadband data analytics engine input data. At block 408, generate a broadband data analytics object that is a representation of aggregated broadband service data for the geographical region.

Turning to FIG. 5, a flow diagram is provided that illustrates a method 500 for providing a broadband data analytics object for a geographical region using a broadband data analytics engine in a data analytics system. At block 502, communicate broadband analytics engine input data comprising broadband expansion target constraints or broadband deployment data to cause a broadband data analytics object computation model to generate a broadband data analytics object. At block 504, access the broadband data analytics object. At block 506, analyze the broadband data analytics object via any of the following: a predictive model analysis, a broadband service analysis model, or a broadband service deployment auditing model.

Example Distributed Computing System Environment

Figure 6:
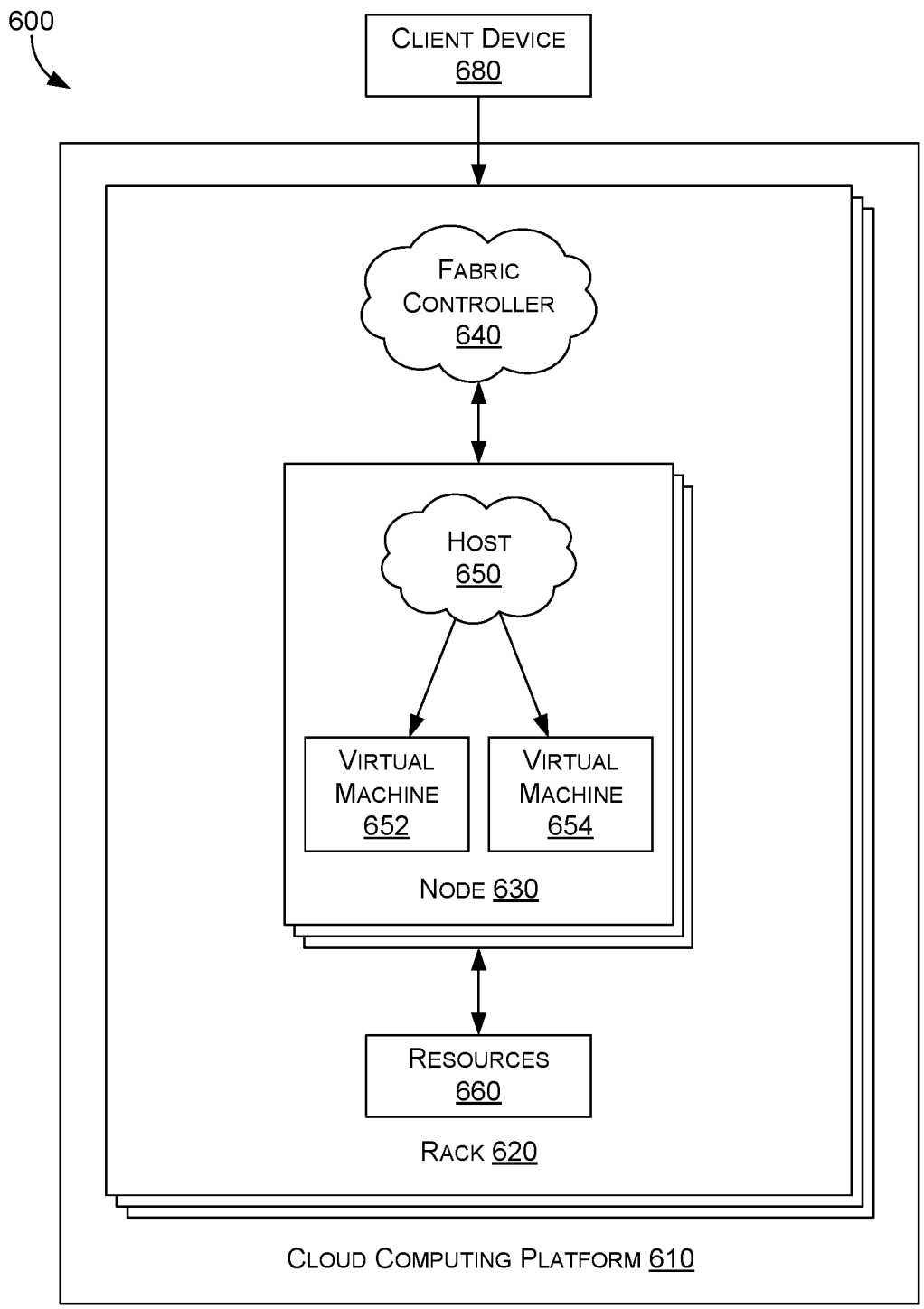
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Figure 7:
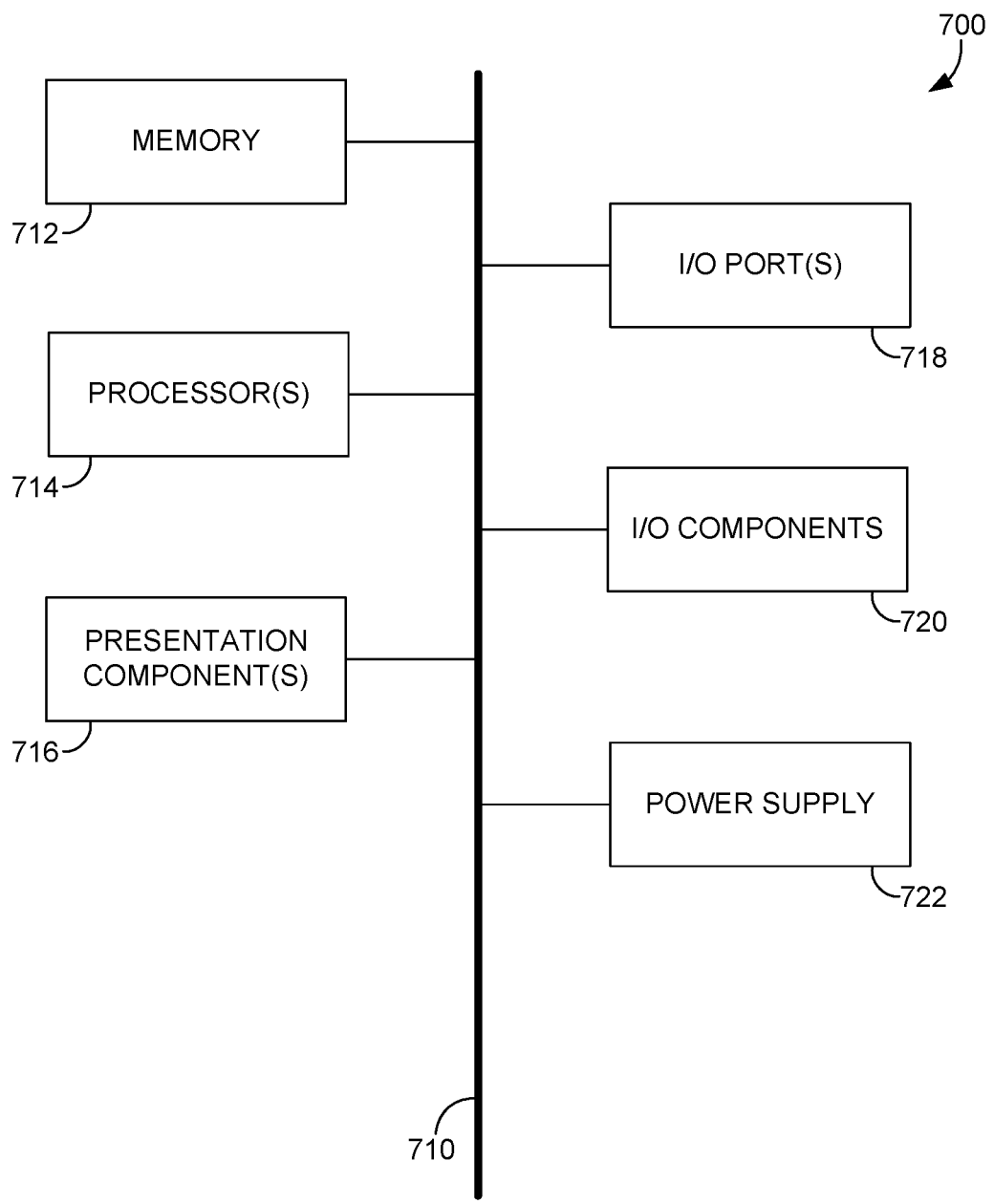
FIG. 7 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 7 in particular, an example operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:
accessing, at a broadband data analytics engine, broadband service data features associated with transmission of wide bandwidth data over a high speed internet connection;
based on broadband service data features, generating a broadband data analytics object computation model, wherein broadband data analytics object computation model comprises a compliance assessment ruleset associated with a decision tree, wherein the broadband analytics object computation model supports generating broadband data analytics objects associated with broadband service availability in corresponding geographical regions;
accessing broadband data analytics engine input data associated with a geographical region, wherein broadband data analytics engine input data comprises broadband expansion target constraints or broadband service deployment data;
based on the broadband data analytics object computation model and the broadband analytics engine input data, generating a broadband data analytics object that is a representation of aggregated broadband service data for the geographical region; and based on generating the broadband data analytics object, generating a broadband service data visualization.

2. The system of claim 1, wherein the broadband service data features comprise a set of broadband expansion target constraints that define traits that are used for targeting broadband expansion to geographical regions and a set of auditing process constraints that define compliance assessment parameters for broadband expansion to geographical regions.

3. The system of claim 1, wherein the compliance assessment ruleset are a set of rules that support validating the broadband data analytics engine input data against the aggregated broadband service data of the broadband data analytics object.

4. The system of claim 1, wherein the compliance assessment ruleset is associated with checking location accuracy, identifying duplicated data, identifying a risk of duplicated data, and identifying broadband speed that is enabled at a location.

5. The system of claim 1, wherein the broadband analytics engine input data is accessed via a broadband data analytics Application Programming Interface that supports communications between broadband data analytics engine clients and a broadband data analytics engine.

6. The system of claim 1, wherein generating the broadband data analytics object is based on a plurality of geo-datasets comprising geospatial datasets, spatial datasets, and address datasets and a building information model.

7. The system of claim 1, wherein generating the broadband service visualization is based on a web-service that provides a broadband data analytics interface for accessing broadband service data associated with the broadband data analytics object.

8. The system of claim 1, wherein the broadband data analytics engine configured for validating one or more broadband expansion target constraints or one or more broadband service deployment data attributes, wherein validating the one or more broadband expansion target constraints or the one or more broadband service deployment data attributes is based on identifying an inconsistency between the one or more broadband expansion target constraints or the one or more broadband service deployment data attributes and a corresponding attribute of broadband service data in the broadband data analytics object.

9. The system of claim 1, further comprising broadband data analytics engine client configured for communicating the broadband data analytics object to cause analysis of the broadband data analytics object via a predictive analysis model of a broadband service provider, a broadband service expansion analysis model, or a broadband service deployment auditing model.

10. A computer-implemented method, the method comprising:
accessing a broadband data analytics object model, wherein the broadband data analytics object computation model supports generating broadband data analytics objects associated with broadband service availability in corresponding geographical regions;
accessing broadband data analytics engine input data associated with a geographical region, wherein broadband data analytics engine input data comprises broadband service deployment data;
based on the broadband data analytics object computation model and the broadband data analytics engine input data, generating a broadband data analytics object that is a representation of aggregated broadband service data for a geographical region; and
based on generating the broadband data analytics object, validating one or more broadband service deployment data attributes.

11. The method of claim 10, wherein broadband data analytics object model is generated based on broadband service data features, the broadband service data features comprising a set of broadband expansion target constraints that define traits that are used for targeting broadband expansion to geographical regions and a set of auditing process constraints that define compliance assessment parameters for broadband expansion to geographical regions.

12. The method of claim 10, wherein broadband data analytics object computation model comprises a compliance assessment ruleset associated with a decision tree, wherein the compliance assessment ruleset are a set of rules that support validating the broadband data analytics engine input data against the aggregated broadband service data of the broadband data analytics object.

13. The method of claim 10, wherein validating the one or more broadband service deployment data attributes is based on identifying an inconsistency between the one or more broadband service deployment data attributes and a corresponding attribute of broadband service data in the broadband data analytics object.

14. The method of claim 10, wherein the broadband analytics engine input data is access via a broadband data analytics Application Programming Interface that supports communications between broadband data analytics engine clients and a broadband data analytics engine.

15. The method of claim 10, the method further comprising based on validating the one or more broadband deployment data attributes, flagging a risk of broadband service data based on broadband expansion targeting constraints or auditing process constraints.

16. The method of claim 10, the method further comprising validating one or more broadband expansion target constraints, wherein validating the one or more broadband expansion target constraints is based on identifying an inconsistency between the one or more broadband expansion target constraints a corresponding attribute of broadband service data in the broadband data analytics object.

17. One or more computer-storage media having computer-executable instructions embodied thereon that, when executed by a computing system having a processor and memory, cause the processor to perform operations comprising:
accessing, at a broadband data analytics engine, broadband service data features associated with transmission of wide bandwidth data over a high speed internet connection;
based on broadband service data features, generating a broadband data analytics object computation model, wherein broadband data analytics object computation model comprises a compliance assessment ruleset associated with a decision tree, wherein the broadband analytics object computation model support generating broadband data analytics objects associated with broadband service availability in corresponding geographical regions; and
deploying the broadband data analytics computation model to cause generation of a broadband data analytics object based on the broadband data analytics object computation model and broadband data analytics engine input data, the broadband data analytics object is a representation of aggregated broadband service data for the geographical region.

18. The media of claim 17, wherein the broadband service data features comprise a set of broadband expansion target constraints that define traits that are used for targeting broadband expansion to geographical regions and a set of auditing process constraints that define compliance assessment parameters for broadband expansion to geographical regions.

19. The media of claim 17, wherein the compliance assessment ruleset are a set of rules that support validating the broadband analytics engine input data against the aggregated broadband service data of the broadband data analytics object.

20. The media of claim 17, wherein the broadband data analytics computation object is associated with validating one or more broadband expansion target constraints or one or more broadband service deployment data attributes, wherein validating the one or more broadband expansion target constraints or the one or more broadband service deployment data attributes is based on identifying an inconsistency between the one or more broadband expansion target constraints or the one or more broadband service deployment data attributes and a corresponding attribute of broadband service data in the broadband data analytics object.

* * * * *

UNITED STATES PATENT AND TRADEMARK OFFICE
CERTIFICATE OF CORRECTION

PATENT NO. : 11,996,985 B2
APPLICATION NO. : 17/948957
DATED : May 28, 2024
INVENTOR(S) : Manuel Felipe Avella Niño et al.

Page 1 of 1

It is certified that error appears in the above-identified patent and that said Letters Patent is hereby corrected as shown below:

On the Title Page

Please add the following inventor names and addresses, on Column 1, Line 10, (72) Inventors:
Ruslan Askerov, Boston, MA (US)
Kaavya Krishna-Kumar, Boston, MA (US)
Deepak Trehan, Boston, MA (US)
Emma Erminia Quirk, Boston, MA (US)

Signed and Sealed this
Ninth Day of September, 2025

Coke Morgan Stewart
*Acting Director of the United States Patent and Trademark Office*